March 4, 1969 O. H. MEREDITH 3,430,354
GRAIN BLENDER
Filed Oct. 6, 1967 Sheet 4 of 4

INVENTOR
OLIVER H. MEREDITH
By Stevens, Davis, Miller & Mosher
ATTORNEYS

United States Patent Office 3,430,354
Patented Mar. 4, 1969

3,430,354
GRAIN BLENDER
Oliver H. Meredith, R.R. 6, Thamesville,
Ontario, Canada
Filed Oct. 6, 1967, Ser. No. 673,362
Claims priority, application Canada, Apr. 28, 1967,
989,122
U.S. Cl. 34—172             10 Claims
Int. Cl. F26b 17/12

ABSTRACT OF THE DISCLOSURE

A paddle type blender adapted to be mounted in grain driers to tower configuration where the grain is dried as it proceeds to move downwardly in the tower as a result of the grain being drawn from the bottom of the tower. The blender shifts the drier grain from adjacent warm walls of the tower to be mixed with the wet grain which is remote from the drying medium. The blender is adapted to be turned by the following grain and its speed of rotation is commensurate with the speed at which the grain is removed from the lower end of the tower.

---

This application relates to the drying of grain and in particular to improvements in blenders associated with grain driers.

The increasing demands for products derived from grain and the accelerated marketing of such products has made it necessary to harvest grain with a high moisture content and dry it artificially for shipmen rather than depend on natural drying by desirable weather conditions. Additionally, the use of artificial grain driers is becoming widely accepted in agricultural areas and in countries having high precipitation measurements.

There are numerous devices for the purpose of drying grain to remove a certain amount of moisture therefrom. One known type of drier consists of a vertical tower subdivided into a plurality of chambers all of which are vertically extending. The outer storage chambers house moist grain therein and each have at least one foraminous wall usually on the inside, adjacent the central chamber into which pressurized hot air is fed. The grain is deposited in the top of the outer chambers until they are filled and at the bottom of the chambers the grain is drawn away by drive means such as augers or the like. As the grain is drawn from the bottom it will slowly progress downwardly in the chambers and as it does so it is subjected to heat by the hot air penetrating the foraminous walls and is dried thereby.

The main disadvantage of driers of the above-mentioned type is that the grain that lies adjacent the foraminous or hot walls receives the highest amount of heat from the adjacent chamber, the temperature of which sometimes reaching as high as 225° F. The grain adjacent the outside or cold wall of the chambers retains its moisture for a longer period than that on the inside walls due to the fact that the hot air can not as easily reach the outside grain as it must firstly proceed through the grain adjacent the foraminous wall. As a result, the grain adjacent the foraminous walls becomes over-dried or in some cases burnt whilst the grain adjacent the outside wall is insufficiently dried. This problem was solved in some degree in applicant's Canadian Patent No. 716,266 of Aug. 24, 1965. According to the patent, a plurality of blenders were positioned in the vertically extending storage chambers to periodically change the location of the hot or dried grain from the inside wall over to the outside wall and thereby allow the moist grain to take the place of the dried grain.

The present application relates to improvements in the art of drying grain and more specifically relates to an improved grain blender over that of the above-mentioned patent. The blender in accordance with the present application is rotated in response to the amount of grain being drawn out of the bottom of the blending chamber and therefore by the downward movement of the grain in the upper portions of the chamber. According to this application, the grain is mixed or blended during the drying operation so as to evenly distribute the dryer grain with that which is still fairly moist. The latter consists of one or more paddle wheel type of units mounted to rotate about a horizontal axis but only a portion of the blades from the paddle project into the chamber enclosing the grain being dried. The paddle wheel is rotated by this downward movement of grain, the only means for moving the blender. Further, and due to the positioning of the paddle wheel, the latter causes a movement in the grain from the side wall adjacent the hot air chamber outwardly towards the outside wall. The grain is therefore transferred from the hot wall to the cooler wall.

A blending device for grain driers of the type including at least one partially foraminous grain storage chamber, means for progressively removing grain from the storage chamber and an adjacent chamber for conveying drying heat to the grain in the storage chamber through the foraminous portion thereof; said blending device being adapted to intermix the grain as it moves through said storage chamber thereby blending the moist and dryer grains together; the blender including a plurality of paddles mounted in said storage chamber for rotation about a horizontal axis, said paddles extending substantially the complete width of said storage chamber; the axis of rotation of the paddles being so positioned with respect to the chamber that the paddles will rotate in response to movement of said grain in the chamber; means interconnecting the common ends of said paddles and baffle means cooperating with said paddles for directing said moving grain onto said paddles.

The invention is illustrated by way of example in the accompanying drawings wherein.

Figure 1:
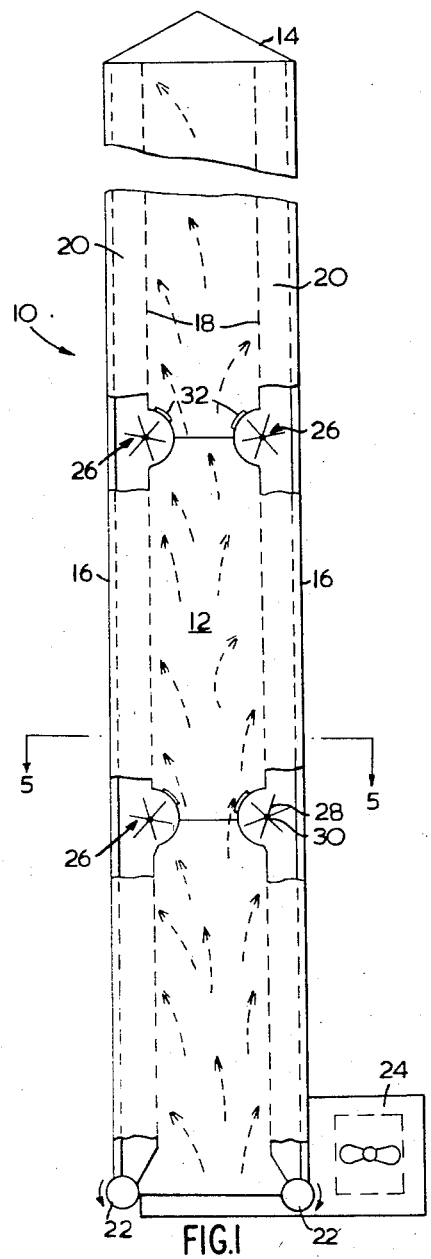
FIGURE 1 is a schematic elevation view, partly in section, of a conventional grain drier embodying a blender in accordance with applicant's aforementioned patent.
Figure 2:
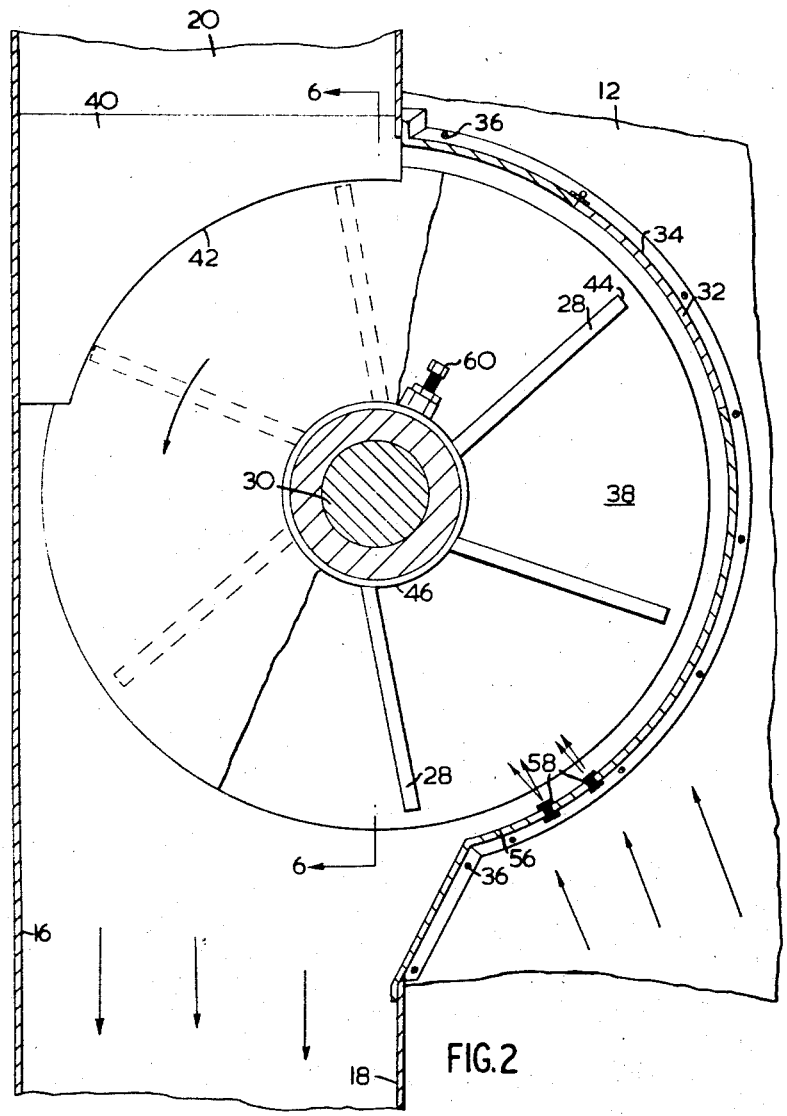
FIGURE 2 is an enlarged partially cross-sectional view of a blending unit constructed in accordance with the present invention.
Figure 4:
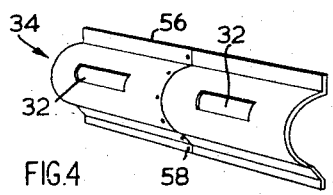
Figure 5:
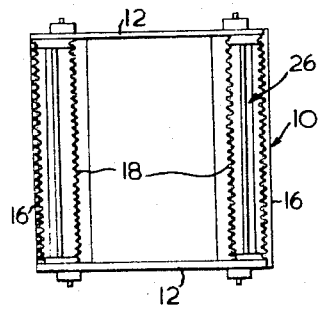
Figures 6, 7:
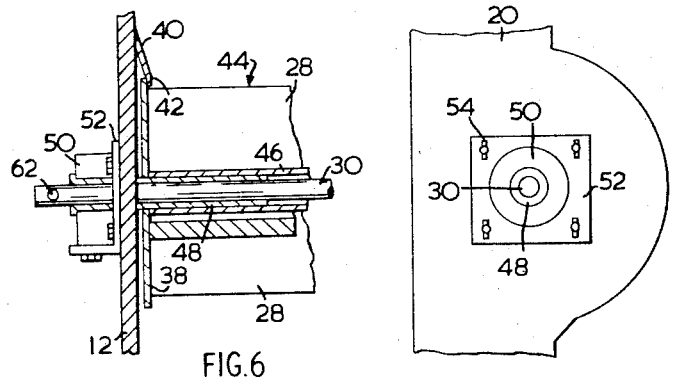

FIGURE 4 illutrates an interior wall cover portion for a blender unit wherein the blender is adapted to be inserted in a drier previously constructed;

FIGURE 5 is a cross-sectional view of the drier of FIGURE 1 taken along the lines 5—5 of that figure;

FIGURE 6 is a partial sectional elevation view taken substantially along the line 6—6 of FIGURE 2; and FIGURE 7 is an end elevation view of the blender unit showing means whereby the latter can be vertically and horizontally adjusted after being installed in a drier.

Referring now to FIGURES 1 and 5 of the drawings, a grain drier is shown generally at 10 and is illustrated as being rectangular in cross-section including end walls 12, a top wall or roof 14, and side walls 16. A pair of intermediary walls 18 extend upwardly within the drier 10 and are arranged parallel to the outside walls 16 to form grain drying chambers 20 as shown. The grain is adapted to be put into the top ends of the drying chambers 20 and it falls by gravity to the bottom ends thereof and means such as augers 22 remove the grain from the chambers to a silo or the like. The grain will move downwardly in the chambers 20 in relation to the amount taken out of the bottom of the chambers by the augers 22. At least the intermediary walls 18 are foraminous and are adapted to allow heat to enter the chambers 20 to dry the grain therein, the patterns of heat to enter the chambers 20 to dry the grain therein, the patterns of heat flow being shown by the broken arrows. A heat producing device and fan arrangement 24 is utilized for passing the heat through the central or heating chamber of the drier. In passing through the body of grain in the chambers 20, the heated air picks up moisture from the grain and leaves the moisture content in the grain something normally below 14%. The temperature of the heated air varies but as mentioned above it sometimes goes as high as 225° F. and it can be exhausted through either outside foraminous wall.

The driers vary in height but those associated with collective silos are adapted to handle substantial amounts, say a thousand bushels and over, and reach as high as 60 or 65 feet. Without the use of a blender in the driers, the grain adjacent the hot wall 18 receives a certain amount of burning by the time it reaches the augers 22 whilst the grain adjacent the outside walls 16 may retain an undesirable amount of moisture by the time it reaches the augers 22. Accordingly, a plurality of blenders 26 are disposed at various vertical positions in each of the chambers 20. Although FIGURE 1 shows that the blenders from one chamber are directly opposite those in the opposing chamber, this is not a necessity as the blenders can be staggered in their vertical arrangement. It is preferable to have one blender near the top end of the drier where the moisture content is highest, as the grain is much dryer by the time it reaches the augers 22.

As schematically shown in FIGURE 1, each blender includes a plurality of paddles 28 mounted to rotate either on or with the rotatable shaft 30 that is fixed in the end walls 12 of the drier. It will be seen from FIGURES 2 and 3 that the paddles or blades form an angle of approximately 20 degrees with respect to a radius to its associated shaft 30, and this lead angle in the direction of rotation as will be hereinafter described facilitates blending of the dried and partially dried grain. It should also be mentioned that although the blenders shown in FIGURE 1 have been placed, in effect, on the inside or hot walls 18 they can just as easily be placed in reverse on the outside or cool walls 16. Moreover, the housings surrounding the blenders can be provided with inspection doors 32 shown in FIGURE 1 and these doors may be utilized both for inspecting and for maintenance purposes.

The structure of the improved blenders is best shown in FIGURES 2 and 6. Each blender 26 is mounted in a housing 34 secured to the end walls 12 such as by screws 36. Each blender 26 has the common ends of its paddles 28 secure, for example by welding, to end plates 38. The peripheral areas of the end plates 38 that protrude into the drying chamber 20 are covered by a baffle plate 40 as shown in FIGURE 2 adapted to direct the grain down onto the paddles 28. It will be seen from FIGURE 6 that the plate 40 must smoothly conform to the configuration of its adjacent end wall to prevent an accumulation of grain at this area and provide a smooth path of travel for the grain. It will also be seen from FIGURE 6 that this plate 40 prevents any movement of grain downwardly between the end plate 38 and the point of rotation of the shaft 30 which could cause binding in this area. The lower portion of the plate 40 is provided with an overlapping lip 42 that overlies the circumferential edge of each end plate 38 as shown in FIGURE 6. It will be noted that the terminal edges 44 of each of the paddles in the blender are radially short of the circumferential edge of the end plate 38 so as to allow room to accommodate the lip. The distance between the ends of the paddles 28 and the outside wall 16 of the chamber 20 is such that jamming does not occur when grain is moving down through this space. If necessary, a curved plate could be used opposite the blender to prevent any such jamming.

The blender units of the present invention can be either preassembled with a drier during manufacture of the latter or they can be fabricated separately for installation in existing driers. As an example of such an installation the blender elements of the type shown in FIGURES 4, 6 and 7 would be used. As shown in FIGURE 6, the shaft 30 supports a hub 46 to which the paddles 28 are attached, the hub 46 being hollow and being adapted to receive therein a sleeve member 48. The hub 46 and shaft 30 as well as the sleeve 48 would be inserted through the side wall 12 of the drier in which an opening had previously been made. The sleeve 48 would be supported by a bearing block or the like 50 which in turn would be mounted on the wall 12 by means of an adjustable plate 52 as shown in FIGURE 7. The latter would either include self-aligning bearings or adjusting means such as slots 54 for the proper positioning of the shaft 30 with respect to the associated drying chamber 20.

As shown in FIGURE 2, the blender hub 46 can be suitably adjusted or tightened by such means as locking studs 60 or by Allen screws, not shown. The shaft 30 extends outwardly at the block 50 and is provided with an aperture 62 for manually rotating the blender with a rod or the like for cleaning and other maintenance purposes.

Figure 3:
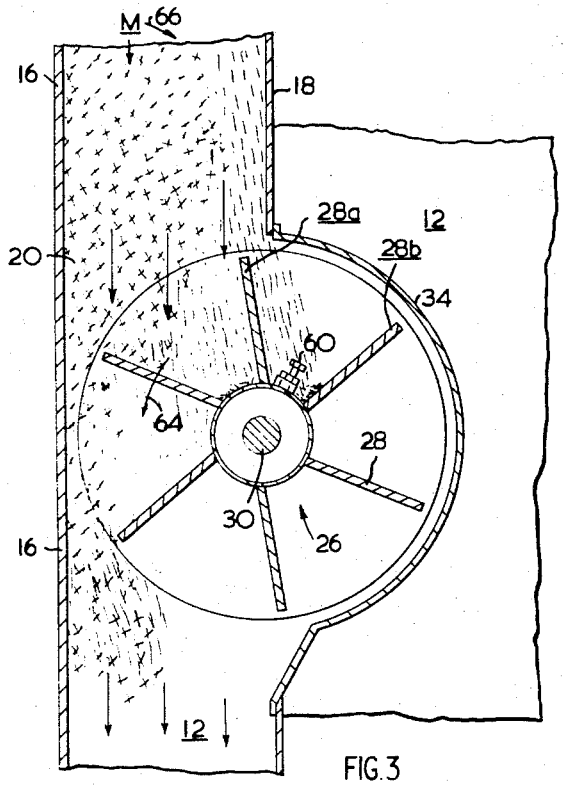
FIGURE 3 is a schematic view in elevation similar to FIGURE 2 and showing the pattern of the moist and dry grain in the column.

For convenience of installation in existing driers, a blender housing 34 would be formed by a shield member 56 shown in FIGURE 4. The shield would be in at least two parts depending upon the length of shield required and would include securing means such as bolts 58. It will be appreciated that the blenders could be up to 20 feet or more in length. This figure also shows a further view of the inspection doors or openings 32. In very long blender assemblies, for example, a 10 or 12 foot long paddle, the supporting sleeve 48 or the shaft 30 would have to be long enough to prevent any buckling of the latter during rotation as the weight of moist grain on the paddle assembly would be quite substantial, especially in a 40 or 50 foot drier. Referring now to FIGURES 2 and 3, it will be noted that there is sufficient room between the outer terminal edges of the paddles and the exterior wall 60 to allow a portion of the grain having the highest moisture content to fall relatively uninhibited past the blender to a position below the latter while the dryer grain adjacent the inner wall 18 is impeded in its downward fall by the blender paddles 28. The latter in being rotated transfers the grain over toward the cool wall 16 where it intermingles with the moist grain.

It will also be noted from FIGURE 2 that the lower portion of the shield 56 may be provided with one or more small apertures 58 to allow the entrance of warm air into the lower area of the blender, thereby warming the terminal end edges 44 of the blender paddles. This assists in preventing clogging of the moist grain intermediate the terminal end edges of the paddles and the outer or cold wall 16 during extremely cold weather.

The blending pattern of the moist grain adjacent the cold wall 16 and the dry grain adjacent the hot wall 18 is shown schematically in FIGURE 3. The moist grain is indicated by cross hatching with the dry grain indicated by straight broken lines. It will be noted that the downward movement of the grain in the chamber 20 affects rotation of the paddles 28 of the blender 26 and as previously mentioned the downward movement of the grain is responsive to the removal of the grain from the lower end of the drier. If removal means such as the augers 22 do not operate then the blenders do not rotate.

Assuming that the grain is in its downward path the paddles will be rotated in the direction of the arrow 64 and as each paddle, say 28a, enters the confines of the chamber 20 from the area of the housing 34, the dryer grain, as indicated, spills downwardly into the area of the paddles 28a and 28b. This causes a shift in the column of the moist grain indicated at M in the direction of the arrow 66, i.e. the angle of repose of the moist grain effects its shift into the area vacated by the dryer grain. Furthermore, as the paddles of the blender rotate about their axis 30 they carry the dryer grain over towards the outer wall 16 where it blends with the moist grain which has been moving downwardly adjacent the wall 16 and accordingly the grain beneath each blender unit 26 receives a substantial mixing as indicated. As a result the moist grain and the dryer grain traverse a somewhat back and forth pattern during a downward movement as each blender is encountered.

The improved blender, when utilized with the described types of driers, is found to function quite successfully on various sizes of kernels. The use of the deflecting shield or baffle 40 and the end plates 38 ensures that substantially all the grain is blended and the passing of grain into the journalled areas of the blender is avoided.

It is to be noted that the blender rotates only in response to grain movement. Driven blenders have been proven to be unsuccessful inasmuch as these tend to jam or pack the grain either above or below the blender.

I claim:

1. A blending device for grain driers of the type including at least one partially foraminous grain storage chamber, means for progressively removing grain from the storage chamber and an adjacent chamber for conveying drying heat to the grain in the storage chamber through the foraminous portion thereof; said blending device being adapted to intermix the grain as it moves through said storage chamber thereby blending the moist and dryer grains together; the blender including a plurality of paddles mounted in said storage chamber for rotation about a horizontal axis, said paddles extending substantially the complete width of said storage chamber; the axis of rotation of the paddlers being so positioned with respect to the chamber that the paddles will rotate in response to movement of said grain in the chamber; means interconnecting the common ends of said paddles and baffle means cooperating with said paddles for directing said moving grain onto said paddles.

2. A blender according to claim 1 wherein each of the paddles is inclined approximately 20° away from the radius which intersects its attached edge.

3. In a grain drier having at least one chamber to confine a body of grain to be dried by the application of heat to at least one wall defining a portion of said chamber, an improved blender for mixing grain in said chamber and adapted to be rotated by the movement of grain therethrough comprising a plurality of blades mounted to rotate freely about a horizontal axis, means interconnecting adjacent ones of said blades at each of opposed ends thereof and shield means overlying said interconnecting means at respective ones of the opposed ends.

4. A blender as defined in claim 2 wherein said angle is in the direction of rotation of said blender.

5. A vertically oriented grain drier comprising a first vertical chamber having a pair of at least partially foraminous members spaced from one another to define a second chamber, said second chamber being substantially to co-extensive with said first chamber and being adapted to confine a body of grain to be dried; means to provide heated air under pressure in said first chamber whereby such air will be forced through said body of grain to remove moisture therefrom and at least one blender disposed in said second chamber; said blender comprising a plurality of blades secured to a member and mounted to rotate freely in response to grain acting on said blades about a horizontal axis, said axis being disposed adjacent said first chamber with the blades projecting into said second chamber, a pair of plates disposed at respective ones of opposed ends of said blades, said blades and plates defining a plurality of open-topped containers disposed about said axis, each of said plates having a radius greater than the radial extent of the blades from the axis and thereby projecting beyond the tips of the blades and a shield means secured to said drier and overlapping the projecting portion of respective ones of said plates.

6. A drier as defined in claim 5 including means adjacent the bottom of said second chamber to remove the grain therefrom.

7. A drier as defined in claim 5 wherein said shaft is journalled in a pair of spaced bearings detachably secured to respective ones of opposed side walls of said drier.

8. A drier as defined in claim 1 wherein the blades of said blender are secured to hub means which is detachably secured to a shaft.

9. An improved grain blender adapted for mounting in a grain drier comprising:
  (a) a plurality of blades fixed to a mounting member and projecting radially from a common axis;
  (b) plate means interconnecting adjacent blades at respective ones of opposed ends thereof, said plate means terminating in a generally circular peripheral portion having a greater radius than the radial extent of the tips of the blades from said common axis;
  (c) shield means having an arcuate portion disposed in overlapping relation with the projecting peripheral portion of said plates;
  (d) said blender being rotated by said grain moving through the blender.

10. A drier as defined in claim 5 wherein the blades of said blender are secured to hub means which is detachably secured to a shaft.

References Cited

UNITED STATES PATENTS

| 1,796,324 | 3/1931 | Farnham | 34—172 |
| 3,053,522 | 9/1962 | Applegate | 34—174 |
| 3,118,574 | 1/1964 | Comte | 34—172 |

FREDERICK L. MATTESON, Jr., *Primary Examiner.*

HARRY B. RAMEY, *Assistant Examiner.*